United States Patent Office 3,057,873
Patented Oct. 9, 1962

3,057,873
PHTHALOCYANINE DYESTUFFS
André Pugin and Jakob Bindler, Riehen, near Basel, Switzerland, assignors to J. R. Geigy A.-G., Basel, Switzerland
No Drawing. Filed Dec. 9, 1960, Ser. No. 74,784
Claims priority, application Switzerland Dec. 10, 1959
6 Claims. (Cl. 260—314.5)

The present invention concerns water insoluble dyestuffs of the phthalocyanine series, processes for the production thereof, their use for the production of inks, in particular of inks for ball point pens and stamp pads and, as industrial product, the inks produced with the aid of these dyestuffs.

The new dyestuffs correspond to the general formula $$[(X_1-SO_2)_m-Pc-(SO_3^{\ominus})_n]^{n\ominus} \cdot [X_2^{\oplus}]_n^{n\oplus} \qquad (I)$$

In this formula:

Pc is the radical of a phthalocyanine. This is either metal-free or, more advantageously, metal-containing, in particular, heavy metal-containing and, principally, containing copper. In addition to the sulphonyl substituents, the benzo radicals of the phthalocyanine dyestuff contain at most only a few halogens, in particular a few chlorine atoms.

$X_1$ is the radical of a polyalkylene polyamine containing at least one lipophilic radical and at least 3 basic nitrogen atoms, which polyalkylene polyamine is bound at one of its N atoms to the $SO_2$ group, and $X_2$ is the ammonium cation of such a polyalkylene polyamine, and $n$ and $m$ are whole numbers the sum of which is at least 2 and at most 4, whereby $m$ must be at least 1 and $n$ can be 0.

$X_1$ and $X_2$ are derived in particular from a polyalkylene polyamine of the general Formula II

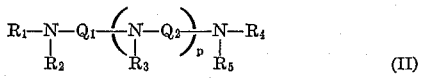

(II)

Of the symbols $R_1$, $R_2$, $R_3$, $R_4$ and $R_5$, at least one R represents a lipophilic radical. Advantageously, only one R— and this $R_1$ or $R_4$— is a lipophilic radical. This is preferably a saturated, branched chain aliphatic group advantageously containing 8–16 and, particularly, 8–12 carbon atoms, advantageously the octyl, iso-octyl, decyl or dodecyl group. The lipophilic radical however can also be an araliphatic group, for example the benzyl group, which can contain saturated aliphatic substituents, e.g. a tert. butyl, tert. amyl, octyl, iso-octyl, decyl and dodecyl group. Also, if desired, the lipophilic radical can be a cycloaliphatic group, for example a cyclohexyl group. The remaining R's advantageously represent hydrogen. However, they can also represent a lower aliphatic group, for example a methyl or ethyl group. In that part of the amine of the general Formula II corresponding to $m$, however, at least one R must be hydrogen.

Each of $Q_1$ and $Q_2$ represents a lower alkylene radical, advantageously an α,β-alkylene radical such as, for example, the 1,2-propylene radical and, preferably the 1,2-ethylene radical. However, each of $Q_1$ and $Q_2$ can also be an α,γ-alkylene radical such as, e.g. the 1,3-butylene radical and, preferably, the 1,3-propylene radical. Preferably $Q_1 = Q_2$. $p$ represents a positive whole number, preferably 1, 2 or 3.

The new dyestuffs of the general Formula I are obtained by reacting one mol of a phthalocyanine compound of the general Formula III

(III)

wherein Pc, $m$ and $n$ have the definitions given above and Z is hydrogen, an alkali metal or an ammonium ion, with $m+n$ mol of a polyalkylene polyamine which contains at least one lipophilic radical and at least three basic nitrogen atoms.

This is done advantageously in aqueous suspension and possibly with the addition of inert organic solvents which are miscible with water and of acid binding agents.

Instead of a single compound of the Formulae II and III, also technical mixtures can be used, the individual components of which correspond to the Formulae II and III. In particular technical mixtures of polyalkylene polyamines of Formula II are used, preferably those which contain a portion of compounds in which $R_1$ and $R_4$ represent the same lipophilic radical and the other R's are hydrogen.

A modification of this process for the production of the new dyestuffs of the phthalocyanine series consists in reacting 1 mol of phthalocyanine sulphonic acid chloride of the general Formula IV $$Pc(SO_2Cl)_{n+m} \qquad (IV)$$

in which the symbols have the meanings given above, with $n+m$ mol of polyalkylene polyamine, the reaction being performed under such conditions that a condensation product is formed which contains $m$ mol of amine in the form of amido groups and $n$ mol in the form of sulphonic acid ammonium salts.

This is done advantageously by reacting 1 mol of phthalocyanine sulphonic acid chloride of the general Formula IV first with $m$ mol of polyalkylene polyamine, advantageously in aqueous suspension and with the possible addition of agents binding the hydrohalic acid, to form the corresponding sulphonic acid amide of the general Formula V $$(X_1-SO_2)_m-Pc-(SO_2Cl)_n \qquad (V)$$

wherein Pc, $X_1$, $m$ and $n$ have the meanings given above. Then this product is converted into the corresponding sulphonic acid by alkaline or acid saponification, which sulphonic acid is reacted either simultaneously or subsequently with $n$ mol of polyalkylene polyamine to form the ammonium salt of Formula I.

The fully formed dyestuffs of the Formula I obtained in dispersion form can be easily filtered off and purified by washing with water. They are blue-black powders which are insoluble in water and difficultly soluble in lower alkanols such as, e.g. methanol or ethanol as well as in lower ketones such as acetone. On the other hand, they are easily soluble in several higher alcohols such as, e.g. benzyl alcohol, or in several ether alcohols such as, e.g. diethylene glycol monoalkyl ethers, e.g in diethylene glycol monoethyl ether Inks for ball point pens and stamp pads which contain dyestuffs produced according to the invention as well as solvents, are distinguished by very good fastness properties of the impressions made therewith to water, lower alkanols, acetone, ether, hydrochloric acid, caustic soda lye, aqueous ammonia, sodium hypochlorite, potassium permanganate and sodium bisulphite. In addition, the inks have good fastness to light.

Such inks may possibly also contain other fast dyestuffs in order to attain the desired shade, for example, glass black.

A particularly good dyestuff according to this invention is

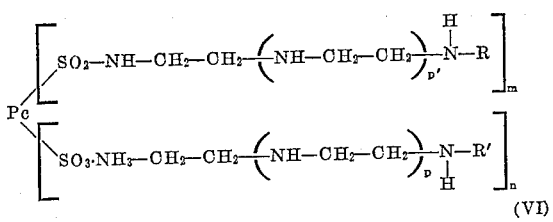

(VI)

wherein:

Pc represents the radical of a metal phthalocyanine, the metal of which is a metal that has an atomic number of from 27 to 29 inclusive, i.e. including copper, nickel and cobalt, R and R' each represents a lipophilic radical selected from the group consisting of an alkyl radical containing 8 to 16 carbon atoms, a cyclohexyl radical and a benzyl radical, $n$ and $m$ each represents a whole number wherein $m$ must be at least 1 and $n$ can be 0, the sum of $n+m$ being at least 2 and at most 4, and $p$ and $p'$ each represents a whole number from 1 to 3 inclusive.

A dyestuff of Formula VI wherein Pc represents the radical of copper phthalocyanine and $p$ and $p'$ each represent 1 is particularly valuable.

The following examples illustrate the invention. Parts are given therein as parts by weight. The temperatures are in degrees centigrade. The relationship of parts by weight to parts by volume is at that of grammes to cubic centimetres.

*Example 1*

320 parts of a mixture consisting chiefly of copper phthalocyanine monosulphonic acid-trisulphonic acid chloride (produced by known methods by heating 200 parts of copper phthalocyanine in 1600 parts of chlorosulphonic acid for 4 hours at 140°), in the form of the moist filter cake are suspended in 2000 parts of ice and 1500 parts of water and the pH is quickly adjusted to 7 with dilute caustic soda lye. Then 472 parts of $N_1$-(1,1, 3,3,5,5-hexamethyl-hexyl)-diethylenetriamine, in the following termed for short tert. dodecyldiethylenetriamine (Amine ODT produced by Monsanto Chemicals), are added and the suspension is stirred for 20 hours at 20–25°. The dyestuff is filtered off, washed with 6000 parts of water and dried in vacuo at 80°. 680 parts of a soft, blue powder are obtained which is difficultly soluble in acetone and ethanol but is up to 50% soluble in benzyl alcohol, octylene glycol or dimethyl formamide.

If, instead of copper phthalocyanine, 200 parts of nickel or cobalt phthalocyanine are used, then dyestuffs having a somewhat more green shade but otherwise similar properties are obtained.

Dyestuffs having very similar properties are obtained if, instead of 472 parts of tert. dodecyl diethylenetriamine, 324 parts of cyclohexyl diethylenetriamine, 400 parts of 3,5,5-trimethylhexyldiethylenetriamine, 376 parts of n-octyl diethylenetriamine, 376 parts of 2-ethylhexyl diethylenetriamine, 425 parts of decyl diethylenetriamine, 545 parts of n-dodecyl triethylene tetramine, 605 parts of n-tetradecyl tetraethylenepentamine or 335 parts of benzyl diethylene triamine are used.

*Example 2*

9.5 parts of a mixture consisting chiefly of copper phthalocyanine monosulphonic acid-trisulphonic acid chloride (produced as described in Example 1), are suspended, in the form of a moist paste, in 100 parts of ice and 50 parts of water. The pH is adjusted quickly to 7 with dilute caustic soda lye and the suspension is stirred at 20–25° with a solution of 12.2 parts of tetradecyl diethylenetriamine in 50 parts of acetone. After 1 hour, 20 parts of 2 N-sodium carbonate solution are added. After stirring for another 10 hours at 20–25°, the dyestuff is filtered off, washed with water and dried at 80° in vacuo. 30 parts of a blue dyestuff are obtained which dissolves very well in benzyl alcohol or in dimethyl formamide.

If, instead of 12.2 parts of tetradecyl diethylenetriamine, 13.6 parts of hexadecyl diethylenetriamine are used, then a dyestuff having very similar properties is obtained.

*Example 3*

15.3 parts of a mixture consisting chiefly of copper phthalocyanine monosulphonic acid-monosulphonic acid chloride (produced by a known method by heating 100 parts of copper phthalocyanine in 800 parts of chlorosulphonic acid for 2 hours at 115°), in the form of the moist filter cake are pasted in 100 parts of ice and 100 parts of water, and the pH is quickly adjusted to 7 with dilute caustic soda lye. Then 11 parts of tert. dodecyl triethylenetetramine dissolved in 50 parts of acetone are added and the suspension is stirred for 14 hours at 20°. The dyestuff is then filtered off, washed with water and dried. It is a blue powder, of which 22 parts are obtained, which dissolves with difficulty in ethanol and acetone but easily dissolves in benzyl alcohol.

Dyestuffs having very similar properties are obtained if, in this example, the 11 parts of tert. dodecyl triethylenetetramine are replaced by 9.3 parts of tert. dodecyl diethylenetriamine, 12.5 parts of tert. dodecyl tetraethylenepentamine, 12 parts of tetradecyl triethylenetriamine, 6.35 parts of cyclohexyl diethylenetriamine or by 6.65 parts of benzyl diethylenetriamine or if the copper phthalocyanine is replaced by cobalt or nickel phthalocyanine.

*Example 4*

5.42 parts of tert. dodecyl diethylenetriamine and 10 parts of 2 N-sodium carbonate solution are added to a suspension of 9.8 parts of copper phthalocyanine tetrasulphonic acid chloride in 100 parts of ice and 100 parts of water. The copper phthalocyanine tetrasulphonic acid chloride is produced by a known process by heating 50 parts of copper phthalocyanine in 600 parts of chlorosulphonic acid for 4 hours at 140° and then treating it with 50 parts of thionyl chloride at 80°. After stirring for 10 hours at 20°, a further 10 parts of 2 N-sodium carbonate solution are added and the suspension is stirred for 2 hours at 90°. After cooling to 25°, 5.42 parts of tert. dodecyl diethylenetriamine are added. After stirring for 1 hour at 25°, the dyestuff is filtered off, washed with water and dried. 19 parts of a blue powder are obtained which dissolves well in benzyl alcohol and diethylene glycol monoethyl ether.

A dyestuff having very similar properties is obtained if the first time 4.5 parts and the second time 8 parts of tert. dodecyl diethylenetriamine are used or if both times or only the second time 4.58 parts of 3,5,5-trimethylhexyl diethylenetriamine or 4.2 parts of 2-ethylhexyl diethylenetriamine are used.

*Example 5*

The suspension of 19.6 parts of copper phthalocyanine tetrasulphonic acid chloride in 200 parts of ice and 100 parts of water is stirred, at pH 7, for 20 hours at 20° with 27.1 parts of tert. dodecyl diethylenetriamine. The dyestuff is filtered off, washed with water and dried at 80°. 40 parts of a blue dyestuff are obtained which does not dissolve well in ethanol and acetone but dissolves well in benzyl alcohol.

A dyestuff having similar properties is obtained if, instead of the 27.1 parts of tert. dodecyl diethylenetriamine, 24.3 parts of n-decyl diethylenetriamine are used.

Example 6

19 parts of a mixture consisting of copper phthalocyanine mono- and di-sulphonic acid-mono- and di-sulphonic acid chloride (produced by heating 100 parts of copper phthalocyanine in 700 parts of chlorosulphonic acid and 10 parts of monohydrate for 2 hours at 140°), in the form of the moist paste, are suspended in 200 parts of ice and 100 parts of water and the pH is quickly adjusted to 7. 28.5 parts of dodecyl monopropylene monoethylenetriamine are added to the suspension. After stirring for 10 hours at 30°, the dyestuff is filtered off, washed with water, dried and isolated whereupon 30 parts of a blue dyestuff are obtained which dissolves well in benzyl alcohol, octylene glycol and diethylene glycol monoethyl ether.

A dyestuff having the same properties is obtained if the 28.5 parts of dodecyl monopropylene monoethylenetriamine are replaced by 29.9 parts of dodecyl dipropylenetriamine.

Dyestuffs of a green shade but otherwise having very similar properties are obtained by replacing the copper phthalocyanine by cobalt or nickel phthalocyanine.

Example 7

19 parts of a mixture consisting chiefly of nickel phthalocyanine monosulphonic acid-trisulphonic acid chloride (produced by heating 50 parts of nickel phthalocyanine in 350 parts of chlorosulphonic acid for 4 hours at 140°), are suspended in 100 parts of ice and 100 parts of water and the pH is quickly adjusted to 7 with caustic soda lye. A solution of 31.3 parts of $N_1$-dodecyl-$N_3$-propyl diethylenetriamine in 100 parts of acetone is added to the suspension. After stirring for 10 hours at 20°, the dyestuff is filtered off, washed with water and dried. 30 parts of a blue powder are obtained which dissolves well in benzyl alcohol.

A dyestuff having similar properties is obtained if, instead of the 31.3 parts of $N_1$-dodecyl-$N_3$-propyl diethylenetriamine, 28.3 parts of $N_1,N_3$-dibenzyl diethylenetriamine are used.

Example 8

32 parts of a mixture consisting chiefly of copper phthalocyanine monosulphonic acid-trisulphonic acid chloride (produced as in Example 1), in the form of the moist filter cake is suspended in 200 parts of ice and 150 parts of water and the pH is quickly adjusted to 7 with dilute caustic soda lye. 21.3 parts of n-decyl diethylenetriamine and 20 parts of 3,5,5-trimethylhexyl diethylenetriamine are added and the suspension is stirred for 20 hours at 20–25°. The dyestuff is filtered off, washed with 800 parts of water and dried at 80°. 62 parts of a soft blue powder are obtained which dissolves up to 50% in benzyl alcohol or dimethyl formamide but is difficultly soluble in acetone and ethanol.

If, in the above example, instead of the 21.3 parts of n-decyl diethylenetriamine, 25 parts of n-decyl triethylenetetramine are used and if, instead of 20 parts of 3,5,5-trimethylhexyl diethylenetriamine, 27.6 parts of 3,5,5-trimethylhexyl tetraethylenepentamine are used, then a dyestuff having similar properties is obtained.

Example 9

30 parts of the dyestuff produced according to Example 1 from tert. dodecyl diethylenetriamine and copper phthalocyanine monosulphonic acid-trisulphonic acid chloride, are dissolved at 120° in 12 parts of octylene glycol and 38 parts of benzyl alcohol. When used as an ink for ball point pens, this deep blue solution produces a blue impression which has very good fastness to water, spirits, acetone, hypochlorite, permanganate, bisulphite, acid and alkali.

Example 10

20 parts of the dyestuff produced according to Example 3 from tert. dodecyl triethylenetetramine and copper phthalocyanine monosulphonic acid-monosulphonic acid chloride and 20 parts of "Kunstharz SK" (ketone resin made by Chem. Werke Hüls, Westphalia, Germany) are dissolved in 20 parts of octylene glycol and 60 parts of triethylene glycol at 100°. Used as an ink for ball point pens, the very stable deep blue solution produces blue impressions the general fastness properties for documentary purposes of which are very good.

What we claim is:

1. A water-insoluble phthalocyanine dyestuff of the formula

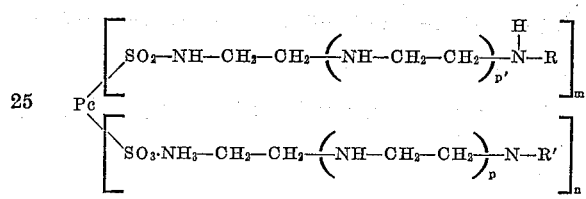

wherein Pc is the radical of metal phthalocyanine, the metal of which is selected from the group consisting of copper, nickel and cobalt, R and R' each is a lipophilic radical selected from the group consisting of alkyl with 8 to 16 carbon atoms, cyclohexyl and benzyl, n and m each represents a whole number, m being at least 1 and the sum of n+m being at least 2 and at most 4, and p and p' each represents a whole number from 1 to 3 inclusive.

2. A water-insoluble phthalocyanine dyestuff of the formula

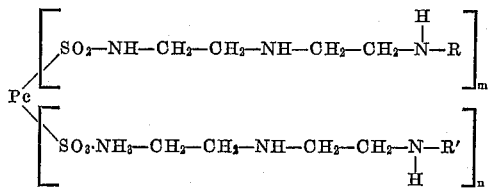

wherein Pc represents the radical of copper phthalocyanine and R and R' each represents a lipophilic radical selected from the group consisting of alkyl with 8 to 16 carbon atoms, cyclohexyl and benzyl, and n and m each represents a whole number, being at least 1 and the sum of n+m being at least 2 and at most 4.

3. The water-insoluble phthalocyanine dystuff of the formula

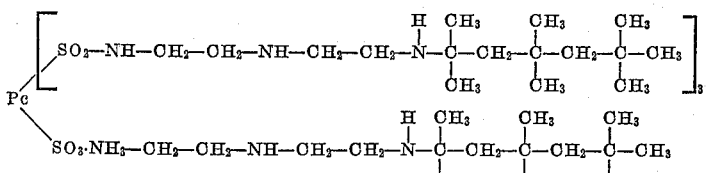

wherein Pc represents the radical of copper phthalocyanine.

4. The water-insoluble phthalocyanine dystuff of the formula

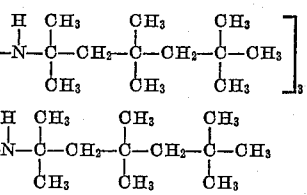
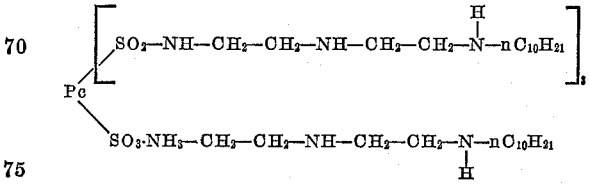

wherein Pc represents the radical of copper phthalocyanine.
5. The water-insoluble phthalocyanine dystuff of the formula
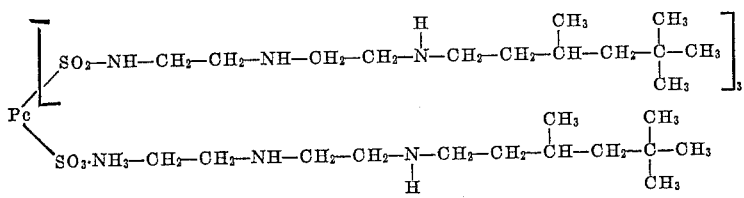
wherein Pc represents the radical of copper phthalocyanine.
6. The water-insoluble phthalocyanine dyestuff of the formula
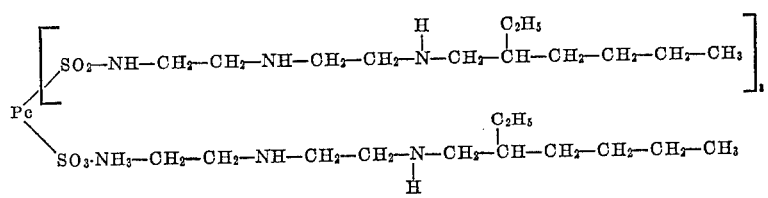
wherein Pc represents the radical of copper phthalocyanine.
No references cited.